United States Patent [19]

Amble

[11] 4,360,088
[45] Nov. 23, 1982

[54] DYNAMIC REBOUND-RESONANCE SUPPRESSION

[76] Inventor: Jay S. Amble, 1117 W. Rosemonte Dr., Phoenix, Ariz. 85027

[21] Appl. No.: 156,115

[22] Filed: Jun. 3, 1980

[51] Int. Cl.³ .............................................. F16F 7/10
[52] U.S. Cl. .................................. 188/380; 101/93.02
[58] Field of Search ................................... 101/93.02; 188/378–380; 408/143

[56] References Cited

U.S. PATENT DOCUMENTS 2,302,670 11/1942 Buchanan ...................... 188/380 X
2,591,115 4/1952 Austin .............................. 408/143 X Primary Examiner—Duane A. Reger
Attorney, Agent, or Firm—James F. Duffy

[57] ABSTRACT

Means and method for harnessing inertial forces so as to suppress rebound-resonance resulting from abruptly stopping a moving body. The inertial forces are generated by a movable mass yieldably and resistently coupled to the moving body. The movable mass maintains its motion when the body is abruptly stopped and the inertial forces coupled to the moving body are out of phase with the rebound reaction forces generated when the movement of the body itself is halted.

15 Claims, 6 Drawing Figures

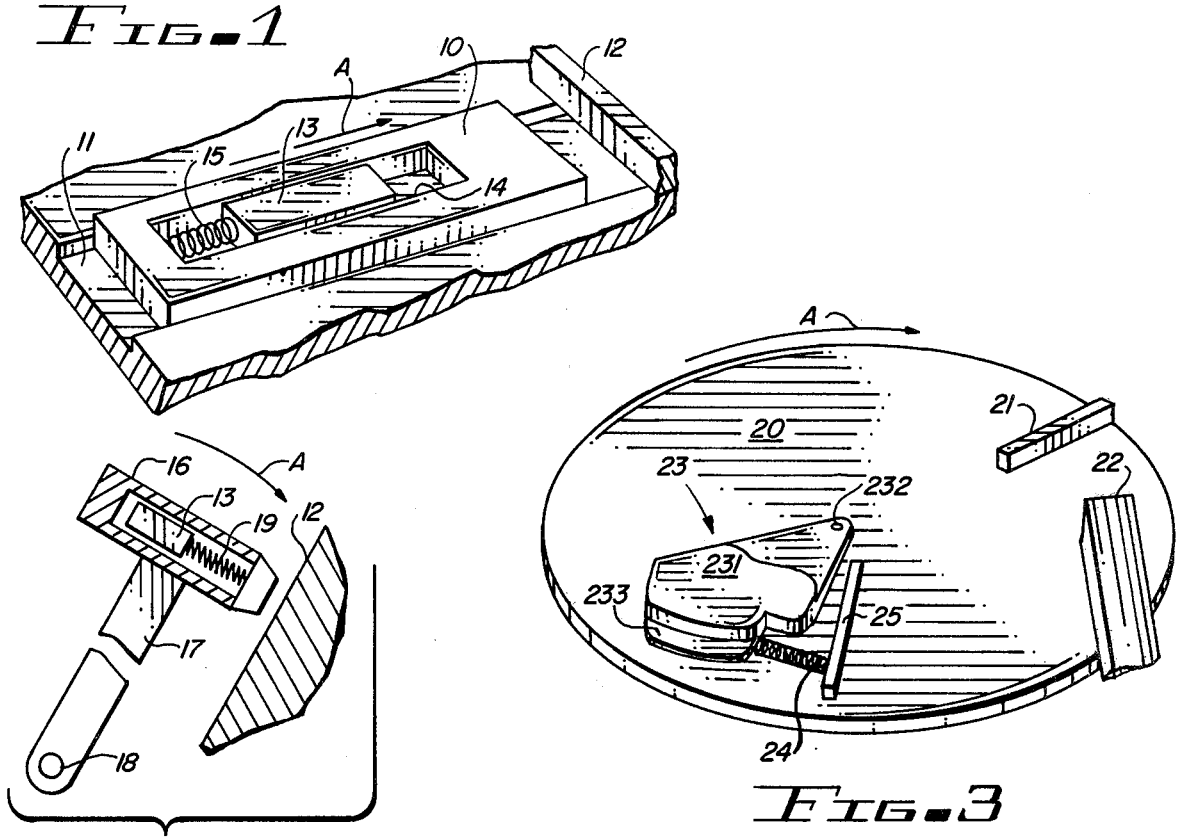
Fig-1
Fig-2
Fig-3
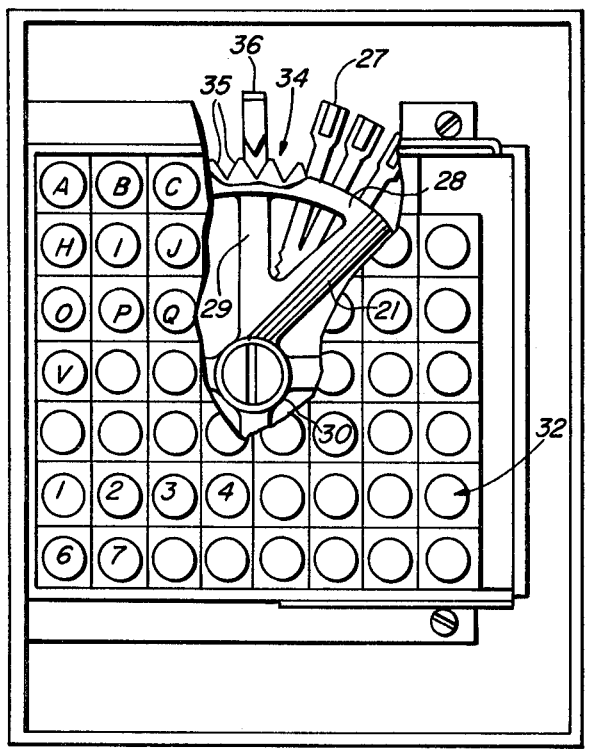
Fig-5 (PRIOR ART)
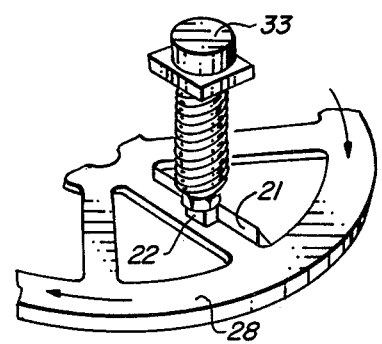
Fig-6 (PRIOR ART)

DYNAMIC REBOUND-RESONANCE SUPPRESSION

BACKGROUND

1. Field of the Invention

The invention relates to the use of inertial drive forces to influence the movement of a body. More specifically, the invention relates to motion of two bodies, one of which is abruptly stopped while the motion of the other is maintained by its own inertia. The two bodies are coupled one to another such that the inertial force of the body, whose motion is maintained, is coupled to the body to be abruptly stopped so as to reduce the tendency of the body so stopped to rebound from the mechanism employed in stopping the body.

2. Prior Art

In many devices, a relatively immovable object is located in the path of a moving object. When the moving object strikes the relatively immovable object, the moving object tends to rebound therefrom. Frequently, it is desired that the moving object be brought to an abrupt halt at the position at which the relatively immovable object is injected into the path of motion of the moving body; that is, the rebound of the moving body from the object interfering with its motion is undesirable. In "Method of Damping Rebound of Print Hammer", U.S. Pat. No. 3,670,647, issued June 20, 1972, to Funk et al., a hammer's rebound upon return to rest position is reduced by causing the hammer to expend energy required to free a relay armature from a magnetic pole face. The force expended in freeing the armature dissipates kinetic energy so that the tendency of the hammer to rebound from its nominal rest position is damped.

In "Shock-Absorbing Means Especially Suitable For Use With Typewheels In Printing Apparatus", U.S. Pat. No. 2,382,668, issued to Salmon, Aug. 14, 1945, a printing telegraph apparatus is disclosed in which the energy of the typewheel is dissipated by a spring-loaded frictional clutch. A detent is then immediately brought into engagement with a detent notch on the typewheel spindle to lock the spindle into position without backlash. It should be noted that where devices such as spring-loaded frictional clutches are employed, the frictional loading of the clutch must be such as to provide a compromise between the frictional loading necessary to damp rebound oscillation and the ability of a shaft to move within the frictional clutch while the clutch driven body is maintained in a fixed position. Increasing the degree of frictional coupling rapidly reduces rebound excursions but simultaneously increases the heat generated at the frictional contact surfaces of clutch and drive shaft. Such heat generation can rapidly deteriorate the effective performance of the frictional clutch.

Resilient couplings, such as spring couplers, are frequently used to damp oscillations. However, as Vischer discloses in his "Telegraphic Printing Mechanism", U.S. Pat. No. 1,979,510, springs are often maintained for the mundane purpose of maintaining two parts capable of relative motion in desired alignment. Vischer discloses a rotatable printing wheel which is keyed to a keyway in a shaft so as to permit a low friction sliding action of the typewheel along the length of the shaft. To maintain the key of the wheel in juxtaposition to a selected side of the shaft's keyway, a spring is used which applies a rotating force to the wheel about the shaft. Thus, departures of the wheel key from contact with the selected side of the keyway is readily corrected by the action of the spring.

Type wheels would appear to be ready subjects for consideration of rebound-resonance damping devices since the speed with which these wheels can be positioned directly affects the speed with which the equipment may be operated. In U.S. Pat. No. 3,970,186 for "Damper For A Composite Print Wheel" issued to Sohl et al. on July 20, 1976, a composite print wheel is illustrated in which elongate arms to which various characters are attached are subject to oscillation when the type wheel is brought to an abrupt stop. An elastomer impregnated fabric ring is disclosed which is adhesively coupled to the character arms of the print wheel to reduce oscillation in these arms when the wheel is abruptly stopped. No disclosure is set forth for assuring the alignment of the type wheel itself after it is stopped. This would appear to be a necessary consideration since the rapid oscillation of the character arms on the type wheel would tend to displace the wheel itself from its selected stopping position.

Other devices having character font wheels which are driven to position and abruptly brought to a stop, are disclosed in U.S. Pat. Nos. 3,901,369, "Electric Indicia Embossing Machine" issued Aug. 26, 1975 to Tsukamoto et al.; 3,726,380 "Card Embossing Apparatus" issued Apr. 10, 1973 to Beers et al.; and 3,753,482, "Automatic Push Button Tape Embossing Machine" issued Aug. 21, 1973 to Brown et al. None of these disclosures teach the use of a rebound-resonance suppression device although there is disclosed means for locking the wheel in position after it has come to rest. It should be here noted that locking devices which come into play while a character font wheel is actively cycling as a result of rebound, may inadvertently lock the character font wheel in a nondesired, intermediate position wherein further processes of the equipment are impeded and may even result in damage to the character font wheel.

While the use of frictional clutches followed by the application of locking or braking devices appears to be quite familiar to those skilled in the art of devices wherein a moving body must be brought to an abrupt halt, little consideration appears to have been given to the use of inertial forces to suppress rebound-resonance. The use of inertial force as a means for damping oscillations and reducing torsional stress and strain in drive shafts is exemplified by U.S. Pat. Nos. 2,383,516 and 2,451,513, both entitled "Oscillation Reducing Device" and issued, respectively, on Aug. 28, 1945 and Oct. 19, 1948. Nelson, in U.S. Pat. No. 1,778,641, for "Vibration Damper" issued Oct. 14, 1930, enlists the cooperation of the inertia of a flywheel and the variable drive coupled through a centrifugal friction clutch to counter-act or damp torsional vibration set up in the crankshaft of an engine having a plurality of cranks.

It is an object of the present invention to provide method and apparatus for utilizing inertial forces to suppress rebound-resonance in a body which is brought to an abrupt stop.

It is a further objective of the invention to apply inertial rebound-resonance suppression to abruptly stop bodies after said bodies have been moving in any one of linear, arcuate, or rotary forms of motion.

It is a secific objective of the invention to provide means and method for achieving inertial rebound-resonance suppression of a character font wheel.

SUMMARY OF THE INVENTION

In a system having a body in motion which must be brought to an abrupt stop, the tendency of the abruptly stopped body to rebound from the means by which it was stopped is suppressed by coupling a movable mass to the body to be abruptly stopped such that this mass will move with the body but will maintain its own motion due to its inertia when the body is abruptly stopped. The inertial force of the continuing motion of the mass is coupled to the body so as to continue to impell the body to move in its original direction and counter to the tendency to rebound from contact with the means used to abruptly stop the body. The mass is coupled to the moving body by means of a resilient coupling. In practice, such coupling may take the form of a spring, an elastomer, or a fluid coupling.

DESCRIPTION OF THE DRAWINGS

FIG. 1 illustrates a body moving along a linear path in the direction of a fixed object which will rapidly bring the moving body to a halt.

FIG. 2 illustrates a body moving arcuately toward a fixed object which will rapidly and abruptly stop the movement of the body in its arcuate path.

FIG. 3 illustrates a body in rotary motion about a point internal to the body. An anvil surface on the rotating body is about to strike a hammer surface which will cause the rotating body to come to an abrupt stop.

FIGS. 1-3 each contain a movable mass which is spring coupled to the moving body in a manner so as to urge the moving body against the obstacle in its path in a manner counter to the tendency of the body to rebound from the obstacle.

FIG. 5 illustrates a portion of a prior art lettering device utilizing the character font wheel of FIG. 4 and having a keyboard for selecting particular characters carried by the character fonts on the wheel and for determining the relative position at which the rotating character font wheel shall be abruptly stopped.

FIG. 6 illustrates the manner in which a key from the keyboard of FIG. 5 causes a hammer surface to strike the anvil surface on the character font wheel to bring the wheel to an abrupt halt.

DETAILED DESCRIPTION OF THE INVENTION

Figure 4:
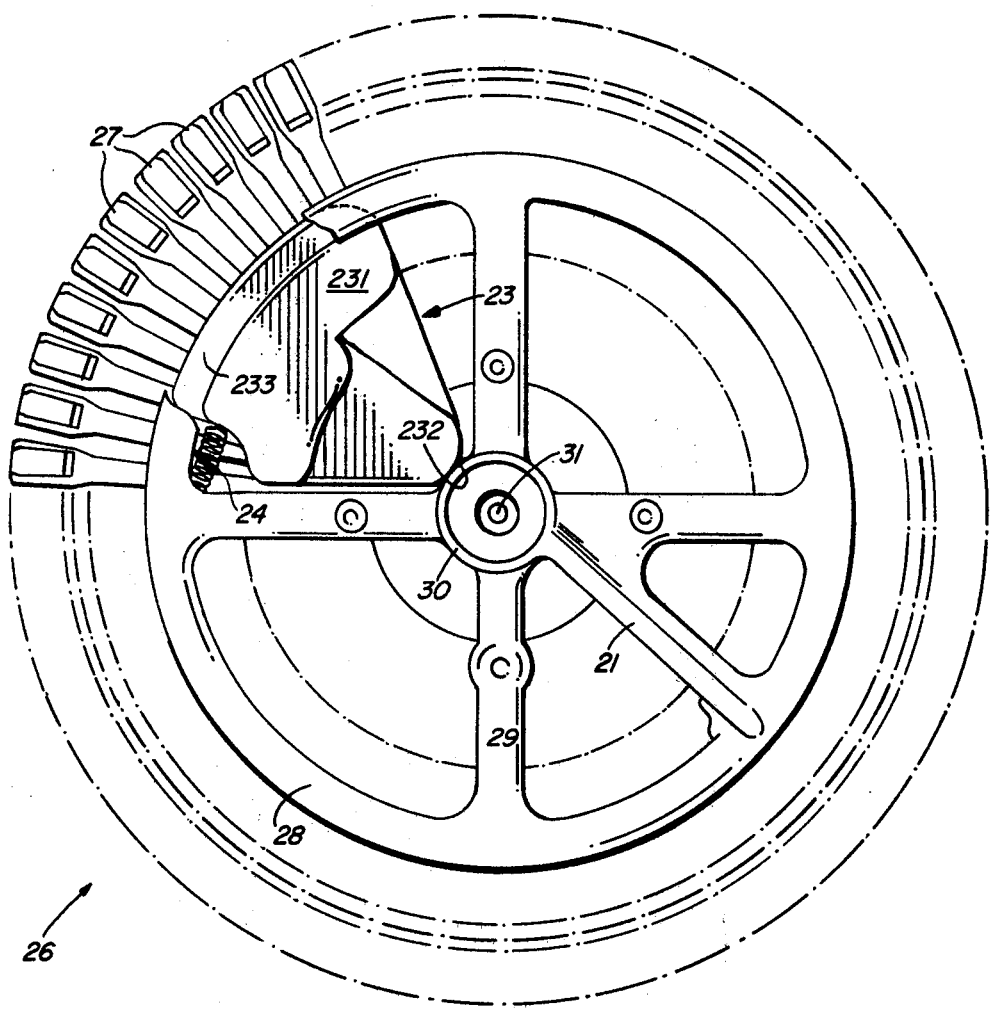
FIG. 4 illustrates a character font wheel having an anvil surface for stopping the rotation of the wheel in a manner similar to that illustrated in FIG. 3. A movable mass is spring coupled to the structure of the font wheel such that the inertia of the mass is coupled to the wheel so as to cause the anvil surface to continue to drive toward the hammer surface utilized to bring the rotating wheel to a halt.

Rebound-resonance is a phenomenon which may be detected audibly as well as visually: The blacksmith moves his hammer down against the anvil and the hammer is heard to reveberate several times against the anvil; similarly, the hammer in a chiming clock may be seen and heard striking the chimes several times for each driven motion of the hammer against the chime. The blacksmith can control and make use of the rebound-resonance imparted to his hammer while the recurrent strking of the chime by the clock hammer may add a pleasant vibrato effect to the sounding of the hours. However, the effects of rebound-resonance may be deleterious and destructive. Machine functions may be delayed while rebound-resonances decay. Surface wear is hastened as moving parts repeatedly clash under the driving motion induced by rebound-resonances.

In FIG. 1, a body 10 has been put in motion in a linear path along track 11. For purposes of exposition, it is unnecessary that the manner in which body 10 was placed in motion need be disclosed. Body 10 could be a wheeled body, or might be supported on fluid bearings. It is necessary only to understand that body 10 is moving with some rapidity along track 11 in the direction indicated by arrow A and that its travel is impeded by the presence of an obstacle 12 which provides the means for stopping body 10 abruptly when body 10 and obstacle 12 come into contact.

A movable mass 13 is carried in guideway 14 of body 10. Movable mass 13 is yieldably and resistently coupled to moving body 10 by means of spring 15. When moving body 10 strikes obstacle 12, movable mass 13 will tend, due to its inertia, to continue its motion toward obstacle 12.

Utilizing techniques well known to the prior art, movable mass 13 may be constrained to remain within guideway 14 while being free, except for the restraint provided by spring 15, to move along the length of guideway 14. When moving body 10 is abruptly stopped by obstacle 12, movable mass 13 continues to move toward obstacle 12 and relative to its nominal resting position with respect to guideway 14. As movable mass 13 travels down guideway 14, the inertial force of its movement is imparted through spring 15 to moving body 10. This inertial force is directed in the same direction as indicated by arrow A. Thus, any tendency on the part of body 10 to rebound from its contact with obstacle 12 will tend to be countered by the inertial force coupled through spring 15 from movable mass 13. The inertial force of moving mass 13 thus tends to maintain body 10 in contact with obstacle 12.

In FIG. 2, body 16 coupled to drive arm 17 is moven arcuately about point 18. Body 16 contains a movable mass 13 which is resiliently and yieldably coupled to body 16 via spring 19. Obstacle 12 is placed in the path of motion of body 16 so as to bring it to an abrupt stop. When moving body 16 strikes obstacle 12, its tendency to rebound therefrom will be offset by the continued motion of mass 13 whose inertial force will be coupled to body 16 through spring 19. The coupling of inertial forces from moving mass 13 to body 16 greatly reduces the rebound-resonance which would otherwise result from body 16 striking obstacle 12.

The teachings of the invention are applicable to any moving body which must be brought to an abrupt stop. In FIG. 3, moving body 20 rotates about its own center in the direction of arrow A. A raised anvil 21 is positioned such that its path will be intercepted by hammer 22 so as to impede the rotation of body 20 and abruptly bring it to a stop.

Rotating body 20 carries on it movable mass 23 which is free to rotate about point 232. Most of the mass of movable mass 23 is located in mass concentration area 231. The intention is to concentrate the bulk of the movable mass closer to the periphery of moving body 20 so that the mass may most efficiently serve its function of suppressing rebound-resonance. A raised land 25 supplies the attachment means for anchoring one end of spring 24 which provides the yieldably resistant coupling between mass 23 and movable body 20. When anvil surface 21 contacts hammer 22, rotating body 20 is brought to an abrupt halt. Mass 23, however, due to its inertia, continues to rotate about point 232. The continued movement of mass 23 exerts an inertial force on flexible coupling 24 urging rotary body 20 to continue its rotation and to maintain anvil 20 in intimate contact with hammer 22, thus, offsetting the effects of rebound-resonance.

If necessary or desirable, several movable masses 23 may be positioned on rotary body 20 to maintain that body in balanced rotation.

It would be well to note that the prior art technique of utilizing a brake or a lock to maintain the body in a fixed position once it has stopped movement may be utilized to great advantage with the invention. Since the effect of the movable mass is to rapidly suppress rebound-resonance, the movable body quickly settles to a stop in intimate contact with the means utilized to interfere with its motion. Ample time is available for a braking or locking device to be then applied before the movable mass reaches the end of its inertia impelled travel. Thus, when the resilient coupling draws the movable mass back toward its nominal resting position on the moving body, the braking or locking devices maintain the movable body at its desired position uneffected by the return travel of the movable mass.

Even without the application of a braking or locking device, the effect of the inertial rebound-resonance suppresser is significant. In experiments performed on a rotating body such as illustrated in FIG. 3, rotating body 20, driven through a slip clutch arrangement required approximately 480 milliseconds from the time anvil 21 first stuck hammer 22 till all resonance perturbations ceased and anvil 21 remained in intimate contact with hammer 22. When a movable mass such as 23 was provided, as disclosed in FIG. 3, all rebound-resonance perturbations had ceased after 200 milliseconds. Further, the inertial rebound-resonance suppresser had reduced the first cycle of resonance from 225 milliseconds to 145 milliseconds. A brake or locking device can be utilized significantly sooner with the rotating body having the inertial resonance suppresser. The inertial resonance suppresser effectively provides an inertial drive force which is out of phase with the rebound reaction force derived by the abrupt contact of the moving body with the stopping means employed to bring the body to a halt. Thus, with or without a locking device, the tendency of the moving body to oscillate or rebound undesirably is significantly reduced.

FIG. 4 suggests the manner in which the invention may be utilized in an existing prior art device. In the background discussion, several prior art references were cited concerning lettering, typing, and embossing devices which made use of a character font wheel. Such a character font wheel 26 is illustrated in FIG. 4. At the periphery of font wheel 26 are supported alpha/numeric or other character fonts 27. An abutment ring 28 provides support and stability to font wheel 27. A similar abutment ring 34, best seen in FIG. 5, is provided with detent notches 35 in which a locking detent 36 may be accepted to rigidly lock character font wheel 26 in a desired position. Spokes 29 connect abutment ring 28 to a central hub 30. At the center of hub 30 is the center of rotation 31 of font wheel 26. In practice, character font wheel 26 is driven about center of rotation 31 by a motor driven shaft coupled to hub 30 by means of a spring-loaded frictional clutch. Character font wheel 26 is provided with an anvil 21 extending from hub 30 to abutment ring 28. A hammer surface may be interposed into the rotating path of anvil 21 so as to bring character font wheel 26 to an abrupt halt.

FIGS. 5 and 6, adapted from U.S. Pat. Nos. 3,726,380 and 3,753,482, respectively, illustrate the environment in which such a character font wheel 26 is utilized. Typically, a character selection means such as keyboard 32 is provided. Keyboard 32 is equipped with individual character keys 33. When a character key 33 is depressed to select a desired character, a stopping hammer 22 (FIG. 6) is interposed in the path of motion of anvil 21 so as to intercept anvil 21 and abruptly halt the rotation of character font wheel 26. With proper slip clutch adjustment between the drive shaft and character font wheel 26, the equipment timing will provide for the movement of detent 36 into a desired detent notch 35 on lower abutment ring 34 whereby character font wheel 26 will be locked into proper position such that a desired character font 27 will be employed to type or emboss a selected character on material such as paper or plastic utilized with the device. With continued use, or through inadvertence, the frictional drive of character wheel 26 may be reduced to the point that the rebound-resonance resulting from anvil 21 striking hammer 22 prolongs the settling time required for character font wheel 26. In such an event, it is possible for detent 36 to mate with a nondesired detent notch 35 or, on occasion, to straddle a position midway between detent notches 35. In the latter event, character fonts 27 will be mispositioned and damage is likely to accrue to the character fonts 27, the character font wheel 26, or associated elements of the device.

Emplacement of an inertial rebound-resonance suppression mass 23, as illustrated in FIG. 4, drastically reduces the rebound reaction of character wheel 26 upon being stopped when hammer 22 intercepts anvil 21. With rebound-resonance suppressed, detent 36 is not misdirected in its movement toward a selected detent notch 35. A beneficial side effect also accrues in that the friction clutch employed may be set to a lower frictional drive level with a concomitant reduction in heat generated at the clutch.

As disclosed in the discussion of FIG. 3, movable mass 23 in FIG. 4 has an area of mass concentration 231 to move the concentration of mass away from center of rotation 31 and achieve a more efficient usage of the inertial forces by moving the Moment arm an extended distance from the center of rotation 31. Movable mass 23 is free to rotate about its point of contact 232 with hub 30. Spring 24 provides the yieldably resistant coupling between movable mass 23 and abutment ring 28 of character wheel 26. A convenient void beneath abutment ring 28 is utilized to movably captivate movable mass 23. This is achieved by providing a lip 233 along one edge of movable mass 23. Lip 233 has a reduced cross section which may be easily slipped beneath abutment ring 28 so as to captivate movable mass 23 on character font wheel 26, yet leaving mass 23 free to rotate about its point of contact 232 with hub 30.

When a key 33 is depressed to select a character 27 on character wheel 26, hammer 22 intercepts anvil 21 so as to halt the rotation of character wheel 26. The inertia of mass 23 maintains it in motion about center of rotation 31. The inertia force of this motion is coupled through spring 24 to abutment ring 28 impelling character wheel 26 to continue its rotation in its original direction and thereby reduce any tendency of anvil 21 to rebound from hammer 22. As the inertial force coupled from mass 23 to character wheel 26 continues to urge anvil 21 into intimate contact with hammer 22, locking detent 36 is moved so as to couple with the desired detent notch 35 thereby locking character font wheel 26 into correct position.

What I have described herein is means and method for harnessing inertial forces so as to suppress rebound-resonance resulting from abruptly stopping a moving body. The inertial forces are generated by a movable mass yieldably and resistently coupled to the moving body. The movable mass maintains its motion when the body is abruptly stopped and the inertial forces coupled to the moving body are out of phase with the rebound reaction forces generated when the movement of the body itself is halted. Because the rebound-resonance is so effectively suppressed by the coupled inertial forces, the through-put time of devices using inertial rebound-resonance suppression may be significantly increased over those of devices lacking such resonance suppression. Other efficiencies may also derive from use of the invention in that frictional drive levels, when used, may be lowered resulting in less energy loss in the form of heat.

The description of the invention as set forth hereinabove and in the accompanying drawings is meant to be exemplary only as an aid to exposition and not to be in any way limiting. Those skilled in the art will conceive of other embodiments of the invention than are set forth herein, which embodiments nevertheless shall fall within the spirit and the scope of the invention as set forth in the claims appended hereto.

Having set forth my invention in such a clear and concise manner in the above description and the accompanying drawings that those skilled in the art may readily and simply practice the invention, that which I claim is:

1. In a system having a first moving mass and stopping means for abruptly stopping the movement of said first moving mass, means for reducing the tendency of said first moving mass to rebound from said stopping means comprising;
   a second mass movably coupled to said first moving mass such that said second mass will move with said first moving mass and will maintain its motion due to its inertia when said first moving mass is abruptly stopped by application of said stopping means;
   means for coupling the inertial force of the maintained movement of said second mass to said first moving mass so as to continue to impell said first moving mass against said stopping means, said inertial force acting counter to the rebound reaction force resulting from application of said stopping means to said first moving mass.

2. The rebound reducing means of claim 1 wherein said first moving mass is a linearly moving body and said second mass comprises a movable mass coupled to said linearly moving body.

3. The rebound reducing means of claim 2 wherein said inertial force coupling means comprises a yieldably resistant coupling between said second mass and said linearly moving body.

4. The rebound reducing means of claim 3 wherein said yieldably resistant coupling comprises a spring.

5. The rebound reducing means of claim 1 wherein said first moving mass is an arcuately moving body and said second mass comprises a movable mass coupled to said arcuately moving body.

6. The rebound reducing means of claim 5 wherein said inertial force coupling means comprises a yieldable resistant coupling between said second mass and said arcuately moving body.

7. The rebound reducing means of claim 6 wherein said yieldably resistant coupling comprises a spring.

8. The rebound reducing means of claim 1 wherein said first moving mass is a rotating body having a center of rotation within said body and said second mass comprises a movable mass coupled to said rotating body.

9. The rebound reducing means of claim 8 wherein said inertial force coupling means comprises a yieldably resistant coupling between said second mass and said rotating body.

10. The rebound reducing means of claim 9 wherein said yieldably resistant coupling comprises a spring.

11. The rebound reducing means of claim 9 wherein said rotating body comprises a character font wheel.

12. The rebound reducing means of claim 11 wherein said stopping means comprises
    anvil means coupled to said rotating body; and
    hammer means selectably positionable to strike said anvil means to bring said rotating character font wheel to an abrupt stop.

13. The rebound reducing means of claim 12 further comprising character selection means coupled to said hammer means operative to selectably establish the relative rotary position at which said character font wheel is abruptly stopped.

14. The rebound reducing means of claim 13 wherein said character selection means comprises a character keyboard having a plurality of character selection keys.

15. The rebound reducing means of claim 14 wherein said hammer means comprises a plurality of anvil striking means at least one of each said anvil striking means coupled to a selected one of said character selection keys.

* * * * *